US011275930B2

(12) United States Patent
Trelin et al.

(10) Patent No.: US 11,275,930 B2
(45) Date of Patent: *Mar. 15, 2022

(54) USING IDENTITY INFORMATION TO FACILITATE INTERACTION WITH PEOPLE MOVING THROUGH AREAS

(71) Applicant: Alclear, LLC, New York, NY (US)

(72) Inventors: Joe Trelin, New York, NY (US); Matthew Snyder, New York, NY (US); Rob Wisniewski, New York, NY (US)

(73) Assignee: ALCLEAR, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,427

(22) Filed: Oct. 28, 2020

(65) Prior Publication Data
US 2021/0042512 A1 Feb. 11, 2021

Related U.S. Application Data

(63) Continuation of application No. 16/843,973, filed on Apr. 9, 2020, which is a continuation of application
(Continued)

(51) Int. Cl.
G06K 9/00 (2006.01)
G06K 9/62 (2022.01)
(Continued)

(52) U.S. Cl.
CPC ..... *G06K 9/00362* (2013.01); *G06K 9/00221* (2013.01); *G06K 9/00288* (2013.01); *G06K 9/00335* (2013.01); *G06K 9/00778* (2013.01); *G06K 9/6203* (2013.01); *G06Q 10/06* (2013.01); *G06Q 10/0631* (2013.01); *G06Q 10/06311* (2013.01); *G06Q 10/063114* (2013.01); *G06Q 90/00* (2013.01); *G06Q 90/20* (2013.01);
(Continued)

(58) Field of Classification Search
CPC ........... G06K 9/00221; G06K 9/00288; G06K 9/00362; G06K 9/00892; H04W 4/024; G06Q 10/06311; G06Q 10/063114; G06Q 90/20

See application file for complete search history.

(56) References Cited

U.S. PATENT DOCUMENTS 7,802,724 B1 9/2010 Nohr et al.
8,381,969 B1 2/2013 Miller et al.
(Continued)

*Primary Examiner* — Andrew W Bee
(74) *Attorney, Agent, or Firm* — Brownstein Hyatt Farber Schreck, LLP

(57) ABSTRACT

A system receives a digital representation of a biometric for a person, uses the digital representation of the biometric to determine and/or otherwise retrieve identity information associated with the person, and uses the identity information to perform one or more actions related to the person's presence in one or more areas. For example, the system may estimate a path for the person and signal an agent electronic device based on the path. In another example, the system may determine a presence of a person within the area and/or transmit information to an agent electronic device regarding the determined presence. In still another example, the system may receive a request to communicate with the person and forward the communication to the person using the identity information.

20 Claims, 17 Drawing Sheets

Related U.S. Application Data

No. 16/731,131, filed on Dec. 31, 2019, now Pat. No. 10,878,230, which is a continuation of application No. 16/394,678, filed on Apr. 25, 2019, now Pat. No. 10,534,956.

(51) Int. Cl.
*G06Q 10/06* (2012.01)
*G08B 13/196* (2006.01)
*G06Q 90/00* (2006.01)
*H04W 4/024* (2018.01)

(52) U.S. Cl.
CPC . *G08B 13/19608* (2013.01); *G08B 13/19641* (2013.01); *H04W 4/024* (2018.02)

(56) References Cited

U.S. PATENT DOCUMENTS

| | | |
|---|---|---|
| 8,423,462 B1 | 4/2013 | Amacker et al. |
| 8,521,131 B1 | 8/2013 | Ramalingam et al. |
| 8,744,966 B1 | 6/2014 | Amacker et al. |
| 8,965,170 B1 | 2/2015 | Benea |
| 9,107,064 B1 | 8/2015 | Ramalingam et al. |
| 9,166,961 B1 | 10/2015 | Johansson et al. |
| 9,202,105 B1 | 12/2015 | Wang et al. |
| 9,324,098 B1 | 4/2016 | Agrawal et al. |
| 9,386,507 B1 | 7/2016 | Ramalingam et al. |
| 9,607,138 B1 | 3/2017 | Baldwin et al. |
| 9,609,577 B1 | 3/2017 | Ramalingam et al. |
| 9,681,350 B1 | 6/2017 | Marupaduga et al. |
| 9,681,359 B2 | 6/2017 | Ramalingam et al. |
| 9,723,131 B1 | 8/2017 | Ramalingam et al. |
| 9,836,642 B1 | 12/2017 | Ramaswamy |
| 9,934,504 B2 | 4/2018 | Wang et al. |
| 9,967,250 B2 | 5/2018 | Johansson et al. |
| 10,027,662 B1 | 7/2018 | Mutagi et al. |
| 10,055,740 B2 | 8/2018 | Hanson et al. |
| 10,104,181 B1 | 10/2018 | Rao et al. |
| 10,108,791 B1 | 10/2018 | Masterman |
| 10,108,961 B2 | 10/2018 | Wang et al. |
| 10,122,727 B2 | 11/2018 | Johansson et al. |
| 10,235,669 B2 | 3/2019 | Amacker et al. |
| 10,242,364 B2 | 3/2019 | Wang et al. |
| 10,243,945 B1 | 3/2019 | Kruse et al. |
| 11,151,481 B1 | 10/2021 | Sun et al. |
| 2004/0221303 A1 | 11/2004 | Sie |
| 2006/0279422 A1 | 12/2006 | Sweatte et al. |
| 2007/0222595 A1 | 9/2007 | Motteram et al. |
| 2008/0209226 A1 | 8/2008 | Venkatesan et al. |
| 2009/0008439 A1 | 1/2009 | Kubler et al. |
| 2009/0291672 A1 | 11/2009 | Treves et al. |
| 2010/0273509 A1 | 10/2010 | Sweeney et al. |
| 2012/0235860 A1 | 9/2012 | Ghazarian et al. |
| 2012/0254084 A1 | 10/2012 | Richter et al. |
| 2012/0278092 A1 | 11/2012 | Pfeffer et al. |
| 2014/0189720 A1 | 7/2014 | Terrazas |
| 2015/0294515 A1 | 10/2015 | Bergdale |
| 2016/0109954 A1 | 4/2016 | Harris et al. |
| 2016/0189063 A1 | 6/2016 | Nie |
| 2016/0275760 A1 | 9/2016 | Block et al. |
| 2017/0169528 A1 | 6/2017 | Kundu et al. |
| 2017/0188103 A1 | 6/2017 | Pan |
| 2017/0292851 A1 | 10/2017 | Chen et al. |
| 2017/0374532 A1 | 12/2017 | Thogersen et al. |
| 2018/0007060 A1 | 1/2018 | Leblang et al. |
| 2019/0036939 A1 | 1/2019 | Johansson et al. |
| 2019/0043207 A1 | 2/2019 | Carranza et al. |
| 2019/0050631 A1 | 2/2019 | Hayase |
| 2019/0075359 A1 | 3/2019 | Boss et al. |
| 2019/0142305 A1 | 5/2019 | Tan et al. |

USING IDENTITY INFORMATION TO FACILITATE INTERACTION WITH PEOPLE MOVING THROUGH AREAS

CROSS-REFERENCE TO RELATED APPLICATION(S)

This application is a continuation patent application of U.S. patent application Ser. No. 16/843,973, filed Apr. 9, 2020 and titled "Using Identity Information to Facilitate Interaction with People Moving Through Areas," which is a continuation patent application of U.S. patent application Ser. No. 16/731,131, filed Dec. 31, 2019 and titled "Using Identity Information to Facilitate Interaction with People Moving Through Areas," which is a continuation patent application of U.S. patent application Ser. No. 16/394,678, filed Apr. 25, 2019 and titled "Using Identity Information to Facilitate Interaction with People Moving Through Areas," now U.S. Pat. No. 10,534,956, the disclosures of which are hereby incorporated herein by reference in their entireties.

FIELD

The described embodiments relate generally to electronic systems that facilitate interaction with people moving through areas. More particularly, the present embodiments relate to systems that use identity information to facilitate interaction with people moving through areas.

BACKGROUND

People move through a variety of different areas. For example, people move through various portions of airports as part of air travel. They arrive at a first airport, move through ticketing, security screening, and a gate onto a plane (possibly also visiting one or more other restaurants, shops, restrooms, and/or other places), fly to a second airport, move through another gate and on out of the second airport, and so on.

People interact with a number of different devices and/or entities as part of moving through such areas. For example, in the airport scenarios discussed above, people may interact with one or more check-in and/or ticketing stations and/or other computing devices, personnel, and so on; security screening devices and/or personnel; restaurant and/or other shopping stations and/or other computing devices, personnel, and so on; gate stations and/or other computing devices, personnel, and so on; onboard aircraft stations and/or other computing devices, personnel, and so on; and/or the like.

SUMMARY

The present disclosure relates to facilitating interaction with people moving through areas. A system receives a digital representation of a biometric for a person, uses the digital representation of the biometric to determine and/or otherwise retrieve identity information associated with the person, and uses the identity information to perform one or more actions related to the person's presence in one or more areas. For example, the system may estimate a path for the person and signal an agent electronic device based on the path. In another example, the system may determine a presence of a person within the area and/or transmit information to an agent electronic device regarding the determined presence. In still another example, the system may receive a request to communicate with the person and forward the communication to the person using the identity information. Various configurations are possible and contemplated without departing from the scope of the present disclosure.

In various embodiments, a system for facilitating interaction with one or more people moving through one or more areas includes at least one non-transitory storage medium that stores instructions, at least one communication unit, and at least one processor communicably coupled to the at least one communication unit. The at least one processor executes the instructions to receive a digital representation of a biometric for a person, use the digital representation of the biometric to determine identity information associated with the person, estimate a path for the person within at least one area, and signal an agent electronic device based on the path using the at least one communication unit.

In some examples, the at least one processor analyzes traffic for the at least one area using at least the identity information. In various implementations of such examples, the at least one processor signals the agent electronic device, using the at least one communication unit, to shift a resource based on the traffic. In a number of implementations of such examples, the at least one processor uses the at least one communication unit to transmit a redirection message based on the traffic to an electronic device indicated as associated with the person in the identity information. In some examples of such implementations, the at least one processor transmits the redirection message to prioritize a first portion of the traffic over a second portion of the traffic. In various implementations of such examples, the traffic includes data from biometric identifications of other people. In some implementations of such examples, the traffic includes data regarding people within the at least one area received from the agent electronic device.

In some embodiments, a system for facilitating interaction with one or more people moving through one or more areas includes at least one non-transitory storage medium that stores instructions and at least one processor. The at least one processor executes the instructions to receive a digital representation of a biometric for a person, use the digital representation of the biometric to determine identity information associated with the person, and determine a presence of the person within at least one area using the identity information.

In various examples, the at least one processor receives an inquiry regarding the presence of the person within the at least one area from an agent electronic device and provides information regarding the presence of the person within the at least one area to the agent electronic device. In some examples, the at least one processor uses the presence of the person within the at least one area and the identity information to estimate a path for the person. In various examples, the at least one processor determines the presence of the person within the at least one area using a location of an electronic device from which the at least one processor receives the digital representation of the biometric. In a number of examples, the at least one processor tracks movement of the person within the at least one area in the identity information.

In some examples, the at least one processor determines the presence of the person within the at least one area by estimating a location of an electronic device indicated as associated with the person in the identity information. In a number of implementations of such examples, the at least one processor estimates the location of the electronic device using global positioning system data.

In various embodiments, a system for facilitating interaction with one or more people moving through one or more areas includes at least one non-transitory storage medium that stores instructions, at least one communication unit, and at least one processor communicably coupled to the at least one communication unit. The at least one processor executes the instructions to receive a digital representation of a biometric for a person, use the digital representation of the biometric to determine identity information associated with the person, receive a request to communicate with the person from an agent electronic device using the at least one communication unit, and forward a communication to the person according to the request using the identity information and the at least one communication unit.

In some examples, the communication provides directions to the person. In various examples, the communication includes updated ticket information for the person. In a number of examples, the at least one processor forwards the communication using at least one of a phone number or an email address included in the identity information.

In various examples, the communication includes an offer for the person. In some implementations of such examples, the at least one processor is operable to receive a response from the person accepting the offer.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
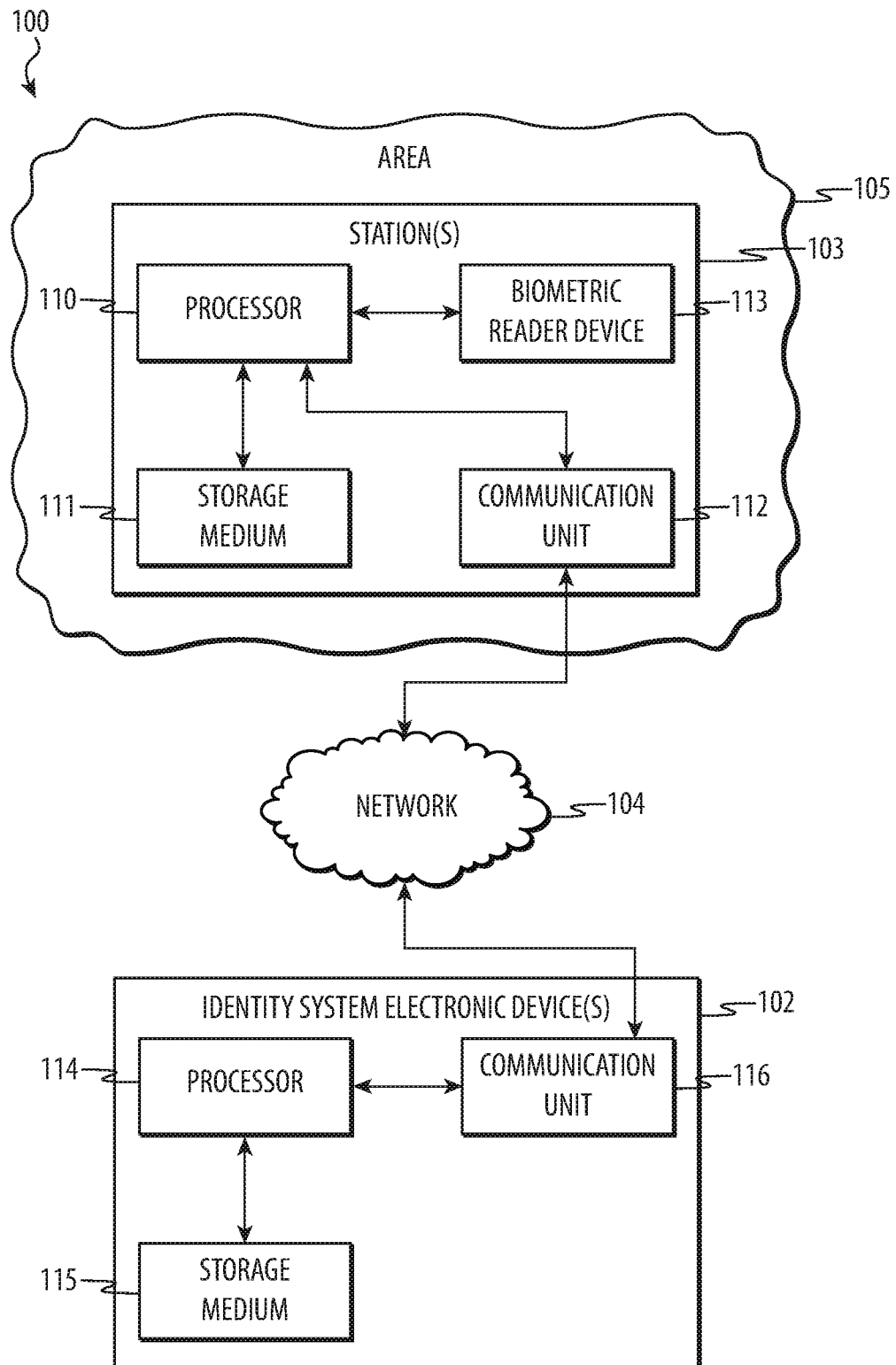
FIG. 1 depicts a first example system for using identity information to facilitate interaction with one or more people moving through one or more areas.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

A variety of different disparate entities may operate electronic systems and/or other devices in areas through which people may move. It may be useful for such entities, systems, and/or devices to know when people are present in various locations in the area, to know where the people move and/or are moving, to be able to communicate with people as they move through the area, and/or otherwise interact with the people moving through and/or otherwise present in the area.

For example, security screening at an airport may have contact with people when the people are at a security screening station. However, the security screening may not be able to be aware when and which people will arrive at the security screening station, which may result in inefficient operation (which may require redundant equipment, personnel, and so on; may result in delays; and/or otherwise operate inefficiently). The security screening may also be unable to communicate with people efficiently either before and/or after they leave the security screening station. By way of illustration, the security screening may resort to repeatedly paging people over a public address system when items are forgotten at the security, which may be unlikely to successfully reach people much of the time as well as being inefficient and bothersome to other people in the airport.

By way of another example, airlines may have contact with people when the people check in for a flight, board through a gate, and/or are present on an aircraft. However, the airlines may not be aware people are present if the people have not initiated contact. Further, the airlines may not be aware of where people travel after a contact. By way of illustration, airline policy may state that seats are subject to reassignment if people are not present by the gate within a half hour from the flight, but the airline may not be adequately aware whether or not this is the case and may not be able to reassign forfeited seats efficiently and timely. The airlines may assume that checked in people are present, even if they are not, until boarding completes and people are missing. The airlines may also repeatedly call out names of people who have not checked in, which may be unlikely to successfully prompt responses much of the time as well as being inefficient and bothersome to other people near the gate.

In another example, restaurants and/or other shopping establishments may have contact with people when the people are purchasing and/or otherwise obtaining goods and/or services. However, the restaurants and/or other shopping establishments may be unaware of people if they people have not initiated contact, and may not be aware of where people go after contact ends. By way of illustration, a store may not be aware of a person passing outside whereas the store might offer the person a shopping incentive to come in if the store was aware.

These various issues may all be addressed by interfacing with an identity system. The identity system may store and/or otherwise control access to identity information for people. The identity information may be used to identify people, verify asserted identity, verify various information associated with identity (such as whether or not a person has a valid flight and/or other ticket and/or other authorization to be in an area, whether or not the person is at least 21 years old and/or another age, whether or not the person has a verified identity document, and so on), process one or more payments, track one or more rewards and/or loyalty accounts, determine presence of a person in an area, track movement of a person, predict and/or otherwise estimate where a person will go, and so on. Such an identity system may control access to the identity information using various identification information. For example, a person may authorize access to part or all of the identity information by providing one or more biometrics and/or digital representations thereof that may be compared against stored biometric data associated with the identity information. By way of another example, an electronic device may provide an authorization token and/or other identifier establishing that the electronic device is authorized to access identity information for one or more people. Regardless, the identity system may communicate with a variety of different devices that may or may not be present in one or more areas to facilitate interaction with one or more people traveling through the area. In this way, the devices may be able to interact with the people in ways they would not otherwise be capable, in ways that are more efficient than they would be able to do otherwise and/or using less hardware and/or software resources and/or other components than would be otherwise possible, and so on. Such devices may be able to locate people, track movement of people, shift resources based on traffic, communicate with people while the people are in the areas, and so on.

The following disclosure relates to facilitating interaction with people moving through areas. A system may receive a digital representation of a biometric for a person, use the digital representation of the biometric to determine and/or otherwise retrieve identity information associated with the person, and use the identity information to perform one or more actions related to the person's presence in one or more areas. For example, the system may estimate a path for the person and signal an agent electronic device based on the path. In another example, the system may determine a presence of a person within the area and/or transmit information to an agent electronic device regarding the determined presence. In still another example, the system may receive a request to communicate with the person and forward the communication to the person using the identity information. Various configurations are possible and contemplated without departing from the scope of the present disclosure.

These and other embodiments are discussed below with reference to FIGS. 1-10. However, those skilled in the art will readily appreciate that the detailed description given herein with respect to these Figures is for explanatory purposes only and should not be construed as limiting.

FIG. 1 depicts a first example system 100 for using identity information to facilitate interaction with one or more people moving through one or more areas. The system 100 may include one or more identity system electronic devices 102 that use stored identity information to facilitate interaction with one or more people moving through one or more areas 105. The identity system electronic device 102 may control access to the identity information, such as by matching one or more received digital representations of biometrics to stored biometric data associated with identity information before providing access to the identity information (though in other examples the access may be provided upon receipt of authorized account logins and/or passwords, authorization tokens, and/or other access control mechanisms without departing from the scope of the present disclosure).

For example, the system 100 may also include one or more stations 103 located in the area 105 that are operable to communicate with the identity system electronic device 102 via one or more networks 104. The station 103 may be operable to provide one or more digital representations of one or more biometrics from one or more people to the identity system electronic device 102 and receive one or more responses from the identity system electronic device 102. The identity system electronic device 102 may use the identity information to provide a variety of different responses to the station and/or one or more other electronic devices. Such responses may identify people, verify asserted identity, verify various information associated with identity (such as whether or not a person has a valid flight and/or other ticket and/or other authorization to be in a section of the area 105, whether or not the person is at least 21 years old and/or another age, whether or not the person has a verified identity document, and so on), process one or more payments, track one or more rewards and/or loyalty accounts, determine presence of a person in the area 105, track movement of a person, predict and/or otherwise estimate where a person will go, and so on.

In various implementations, the identity system electronic device 102 may receive a digital representation of a biometric for a person, use the digital representation of the biometric to determine and/or otherwise retrieve identity information associated with the person, and use the identity information to perform one or more actions related to the person's presence in the area 105. For example, the identity system electronic device 102 may estimate a path for the person and signal an agent electronic device based on the path. In another example, the identity system electronic device 102 may determine a presence of a person within the area 105 and/or transmit information to an agent electronic device regarding the determined presence. In still another example, the identity system electronic device 102 may receive a request to communicate with the person and forward the communication to the person using the identity information.

The station 103 may be any kind of electronic device. Examples of such devices include, but are not limited to, one or more desktop computing devices, laptop computing devices, mobile computing devices, wearable devices, tablet computing devices, mobile telephones, smart phones, printers, displays, kiosks, vehicles, kitchen appliances, entertainment system devices, digital media players, and so on. The station 103 may include one or more processors 110 and/or other processing units and/or controllers, one or more non-transitory storage media 111 (which may take the form of, but is not limited to, a magnetic storage medium; optical storage medium; magneto-optical storage medium; read only memory; random access memory; erasable programmable memory; flash memory; and so on), one or more communication units 112, one or more biometric reader devices 113 (such as a fingerprint scanner, a vein scanner, a palm-vein scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on), and/or one or more other components, such as one or more input/output components (including, but not limited to, one or more displays, touch screens, printers, microphones, speakers, keyboards, computer mice, track pads, and so on). The processor 110 may execute one or more sets of instructions stored in the non-transitory storage media 111 to perform various functions, such as using the biometric reader device 113 to obtain one or more digital representations of one or more biometrics (such as one or more hashes and/or other digital representations of one or more fingerprints, vein scans, palm-vein scans, voiceprints, facial images, retina images, iris images, deoxyribonucleic acid sequences, heart rhythms, gaits, and so on) for a person, communicate with the identity system electronic device 102 via the network 104 using the communication unit 112, and so on.

Similarly, the identity system electronic device 102 may be any kind of electronic device and/or cloud and/or other computing arrangement and may include one more processors 114, non-transitory storage media 115, communication units 116, and/or other components. The processor 114 may execute one or more sets of instructions stored in the non-transitory storage media 115 to perform various functions, such as storing biometric data for people and associated identity information (such as one or more names, addresses, telephone numbers, notification preferences and/or other notification information, social security numbers, frequent flyer numbers, financial data, financial account numbers, verified ages, boarding pass data, flight data, movement data, historic movement data, and so on), receive one or more digital representations of biometrics, match one or more received digital representations of biometrics to stored biometric data, retrieve identity information associated with stored biometric data matching one or more received digital representations of biometrics, provide retrieved identity information, communicate with the station 103 and/or one or more other electronic devices within and/or outside of the area 105 (such as one or more governmental or private biometric and/or identity databases, payment processing systems, identity document verification systems such as a passport and/or driver's license verification and/or other identity card system, no fly list databases, law enforcement databases, and so on) via the network 104 using the communication unit 116, and so on.

Although the system 100 is illustrated and described as including particular components arranged in a particular configuration that perform particular functions, it is understood that this is an example. In various implementations, various arrangements of various components that perform various functions may be implemented without departing from the scope of the present disclosure.

For example, the area 105 is illustrated as a single area 105. However, it is understood that this is an example. In various implementations, the system 100 may facilitate interaction with people as the people move through multiple areas 105 without departing from the scope of the present disclosure. The areas 105 may or may not be related. For example, in some implementations, the system 100 may facilitate interaction with people as the people move through an origin airport, one or more layover airports, and a destination airport. Various configurations are possible and contemplated without departing from the scope of the present disclosure.

By way of another example, the identity system electronic device 102 is illustrated as outside of the area 105. However, it is understood that this is an example. In some implementations, the identity system electronic device 102 may be located inside the area 105, partially within the area 105, and so on without departing from the scope of the present disclosure.

Figure 2:
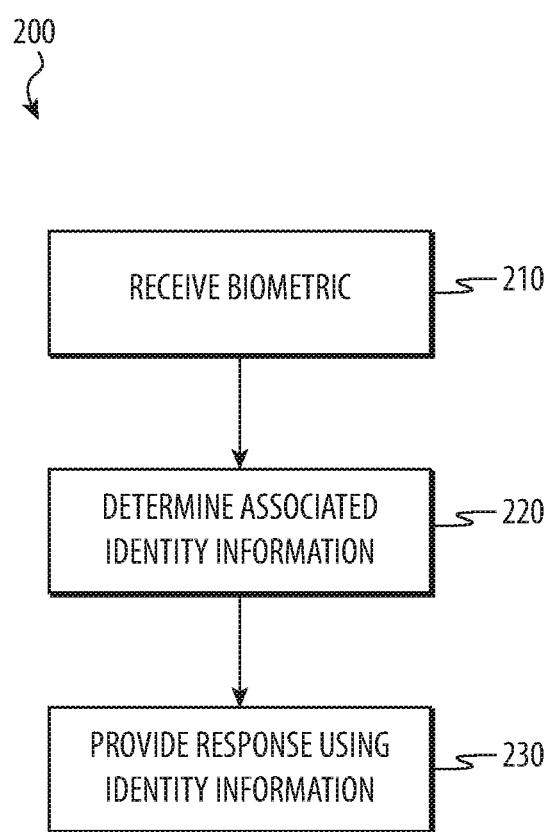
FIG. 2 depicts a flow chart illustrating a first example method for using identity information to facilitate interaction with one or more people moving through one or more areas. This method may be performed by the system of FIG. 1.

FIG. 2 depicts a flow chart illustrating a first example method 200 for using identity information to facilitate interaction with one or more people moving through one or more areas. This method 200 may be performed by the system 100 of FIG. 1.

At operation 210, an electronic device, such as the identity system electronic device 102 and/or the station 103 of FIG. 1, may receive one or more digital representations of one or more biometrics from one or more people. The digital representation of the biometric may include, but is not limited to, one or more hashes and/or other digital representations of one or more fingerprints, vein scans, palm-vein scans, voiceprints, facial images, retina images, iris images, deoxyribonucleic acid sequences, heart rhythms, gaits, and so on. The digital representation of the biometric may be captured using various biometric reader devices. These biometric reader devices may be active and/or passive and may include, but are not limited to, a fingerprint scanner, a vein scanner, a palm-vein scanner, an optical fingerprint scanner, a phosphorescent fingerprint scanner, a still image and/or video camera, a 2D and/or 3D image sensor, a capacitive sensor, a saliva sensor, a deoxyribonucleic acid sensor, a heart rhythm monitor, a microphone, and so on.

At operation 220, the electronic device may determine identity information associated with the digital representation of the biometric. For example, the electronic device may retrieve identity information associated with stored biometric data that matches the digital representation of the biometric.

At operation 230, the electronic device may provide a response using the identity information. The response may facilitate interaction with the person as the person moves through an area. The response may identify the person, verify asserted identity, verify various information associated with identity (such as whether or not the person has a valid flight and/or other ticket and/or other authorization to be in a section of the area, whether or not the person is at least 21 years old and/or another age, whether or not the person has a verified identity document, and so on), process one or more payments, track one or more rewards and/or loyalty accounts, determine presence of the person in the area, track movement of the person, predict and/or otherwise estimate where the person will go, communicate with the person, facilitate communication with the person, and so on.

In various examples, this example method 200 may be implemented as a group of interrelated software modules or components that perform various functions discussed herein. These software modules or components may be executed within a cloud network and/or by one or more computing devices, such as the identity system electronic device 102 and/or the station 103 of FIG. 1.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as providing responses using identity information determined using received digital representations of biometrics. However, other operations may also be performed without departing from the scope of the present disclosure. By way of illustration, the electronic device may use the identity information to determine presence of people, track movement of people, communication and/or facilitate communication with people, and/or otherwise facilitate interaction with people. The electronic device may obtain and store identity information for people when determining identity information associated with a biometric. For example, the electronic device may record in the identity information that the digital representation of the biometric for the person has been received from a station in a particular location, indicating that the person is present at the particular location. Various configurations are possible and contemplated without departing from the scope of the present disclosure.

Figure 3A:
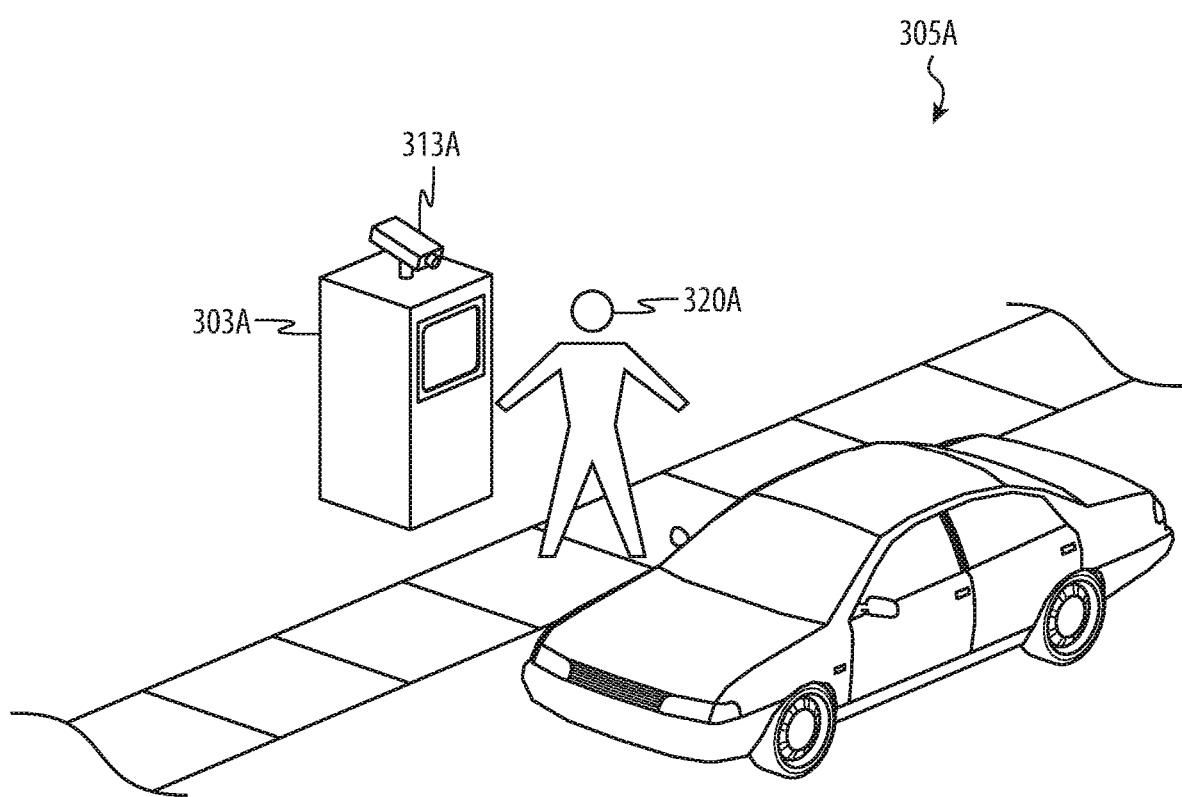
FIG. 3A illustrates a first example implementation of the system of FIG. 1.

FIG. 3A illustrates a first example implementation of the system 100 of FIG. 1. In this example, a station 303A includes an external biometric reader device 313A configured as a camera. The biometric reader device 313A may actively and/or passively obtain digital representation of biometrics from a person 320A. For example, the biometric reader device 313A may capture one or more images of one or more irises, retinas, facial images, and so on of the person 320A as the person 320A arrives at an area 305A.

For example, the biometric reader device 313A may capture one or more digital representations of biometrics of the person 320A as the person 320A arrives at an airport. The digital representation of the biometric may be used to retrieve identity information for the person. The identity information may be used to identify the person 320A, check the person 320A in for a flight, communicate flight information to the person 320A (such as by transmitting gate information, flight information, seat assignment, an airport map, directions through the airport, directions to a particular security lane, and so on to an electronic device and/or email and/or other messaging system account associated with the person 320A), determine or estimate airport traffic that includes the person 320A, shift resources based on the person and/or traffic determined and/or estimated including the person 320A, and so on.

Figure 3B:
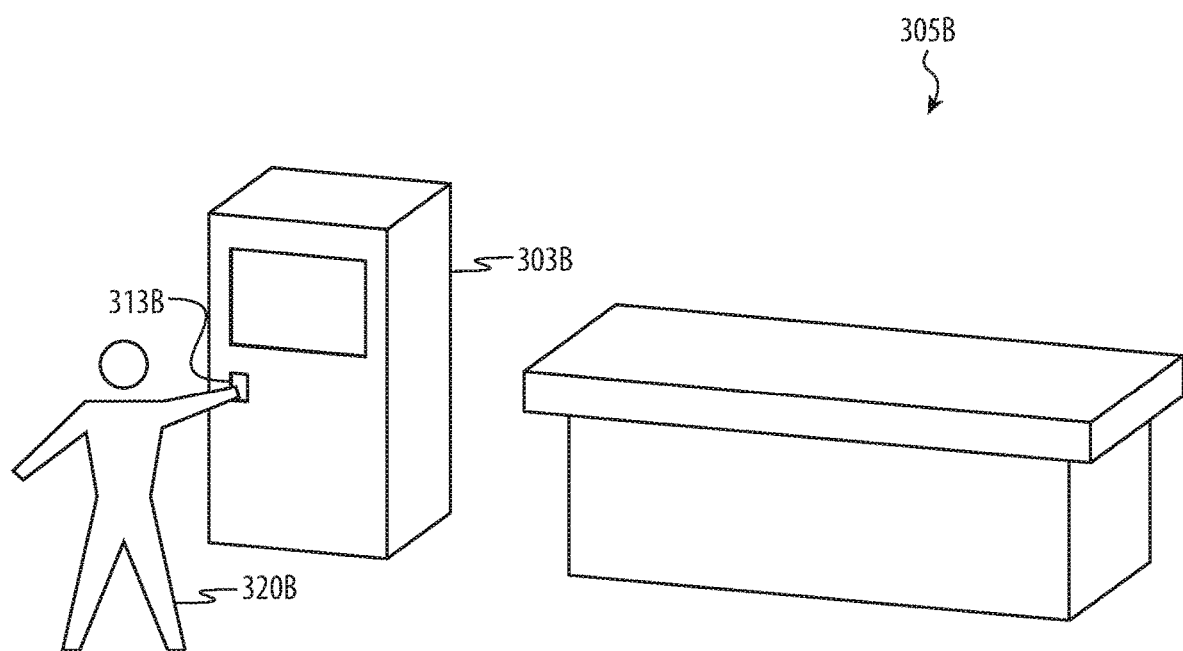
FIG. 3B illustrates a second example implementation of the system of FIG. 1.

FIG. 3B illustrates a second example implementation of the system 100 of FIG. 1. In this example, a station 303B at an area 305B includes an integrated biometric reader device 313B configured as a fingerprint scanner. The biometric reader device 313B may obtain digital representation of one or more fingerprints from a person 320B. For example, the station 303B may be a check-in kiosk at a ticketing counter at an airport that may use the biometric reader device 313B to capture one or more digital representations of one or more fingerprints of the person 320B as the person 320B checks in for a flight, drops off check luggage, pays to upgrade flight options, and so on.

Figure 3C:
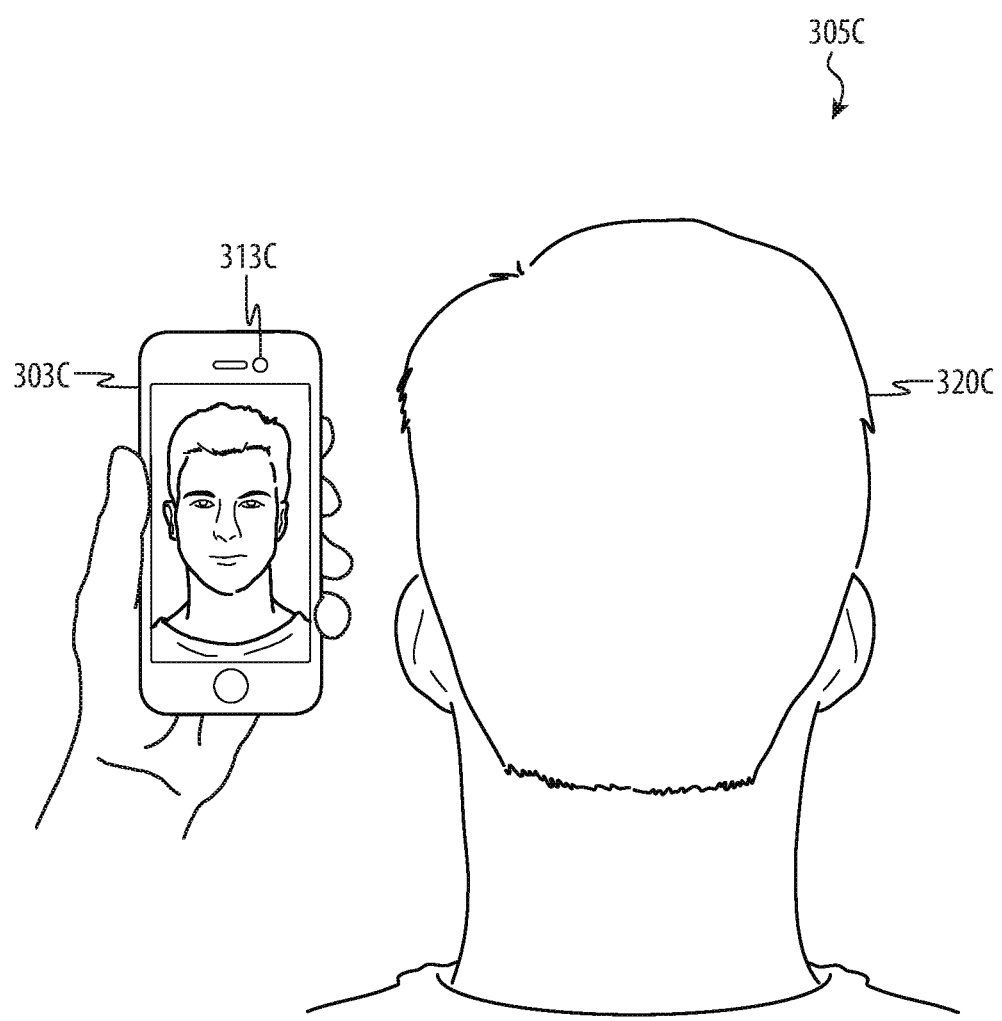
FIG. 3C illustrates a third example implementation of the system of FIG. 1.

FIG. 3C illustrates a third example implementation of the system 100 of FIG. 1. In this example, a station 303C may be a personal electronic device that may be operated by a person 320C in an area 305C. The station 303C may include an integrated biometric reader device 313C configured as an integrated image sensor. For example, the personal electronic device may execute an app and/or other application that obtains one or more digital representations of biometrics for the person 320C using the image sensor and communicates with an identity system to check the person 320C in for a flight, obtain flight and/or other gate information and/or other directions, and so on.

Figure 3D:
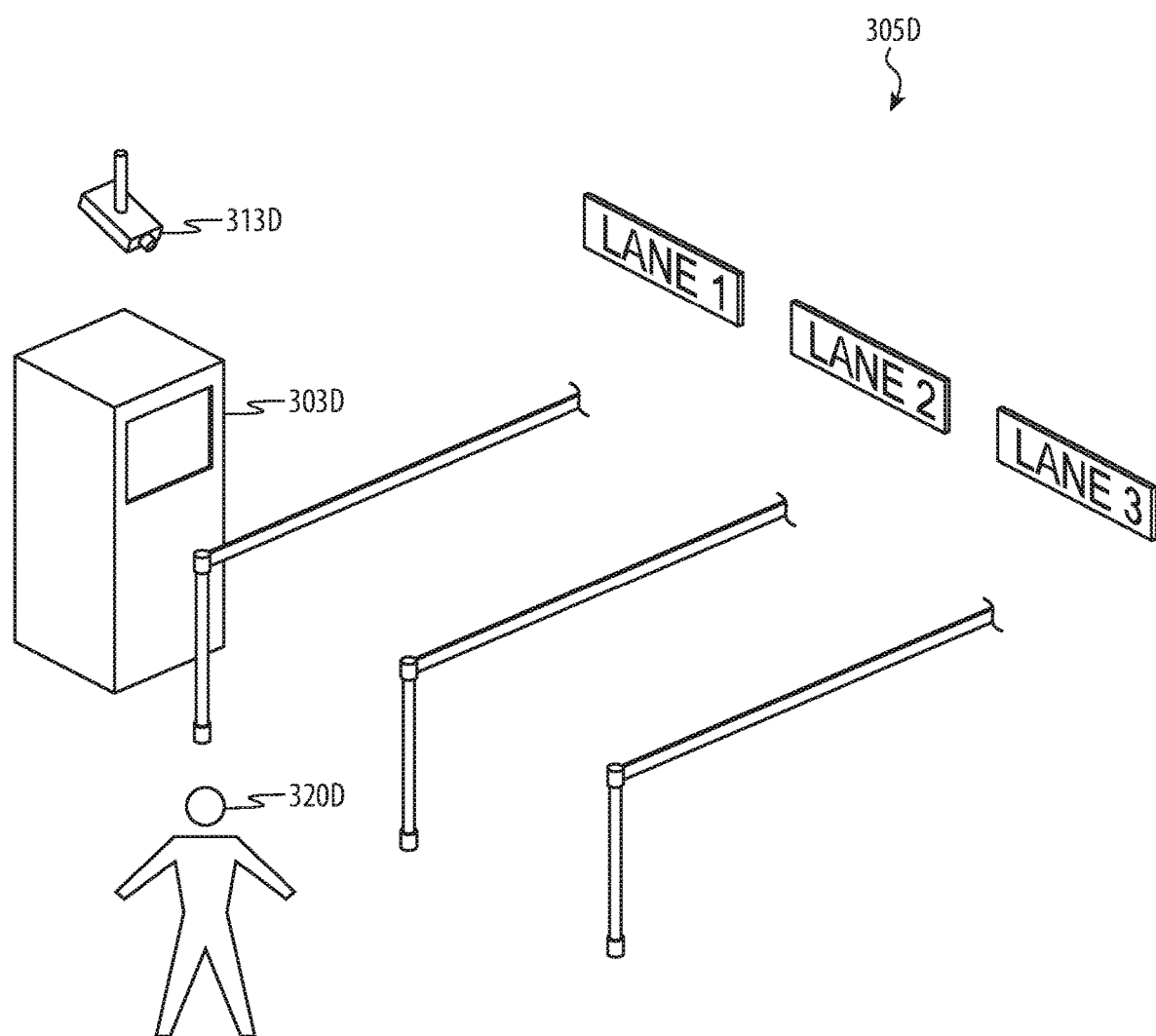
FIG. 3D illustrates a fourth example implementation of the system of FIG. 1.

FIG. 3D illustrates a fourth example implementation of the system 100 of FIG. 1. In this example, a station 303D includes an external biometric reader device 313D configured as a camera. The biometric reader device 313D may actively and/or passively obtain a digital representation of biometrics from a person 320D as the person 320D approaches a number of access lanes (such as security screening access lanes) at an area 305D.

For example, traffic may be monitored and analyzed using the biometric reader device 313D and/or other data and resources (such as access lane personnel, hardware and/or software resources, and so on) may be shifted based on the traffic. By way of another example, the access lanes may include different tier lanes (such as a general security screening access lane, a reduced security screening access lane, a priority reduced security screening access lane, and so on) and the person 320D may be directed to an access lane associated with information included in their identity information. In yet another example, the person 320D may be directed to a faster and/or slower security screening access lane based on whether the person 320D has flight information indicated in their identity information that departs sooner and/or later than other people in the area 305D (such as to prioritize people with sooner departing flights over people with later departing flights).

In other examples, the station 303D may be situated at a location other than proximate to access lanes. By way of illustration, the station 303D may use identity information for the person 320D to determine and/or estimate a path for the person 320D through the area 305D and determine that the person 320D is not in a correct location and/or at a correct time. For example, the person 320D may become lost and go to an incorrect terminal in an airport. As such, a communication may be forwarded to the person 320D directing the person 320D to where the person 320D should be. In another example, the station 303D may determine that the person 320D reaches an airport gate prior to passing security screening and/or sooner after passing security screening than should be possible. As such, the station 303D may flag that the person 320D may be acting suspiciously and alert the authorities. In still another example, the station 303D may detect that an airline pilot has an alcoholic beverage within a prohibited amount of time (such as twenty-four hours before a flight) and/or is otherwise behaving in a concerning manner. As such, the station 303D may transmit an alert about the airline pilot to an appropriate authority who may take action to investigate and/or handle the situation.

Figure 3E:
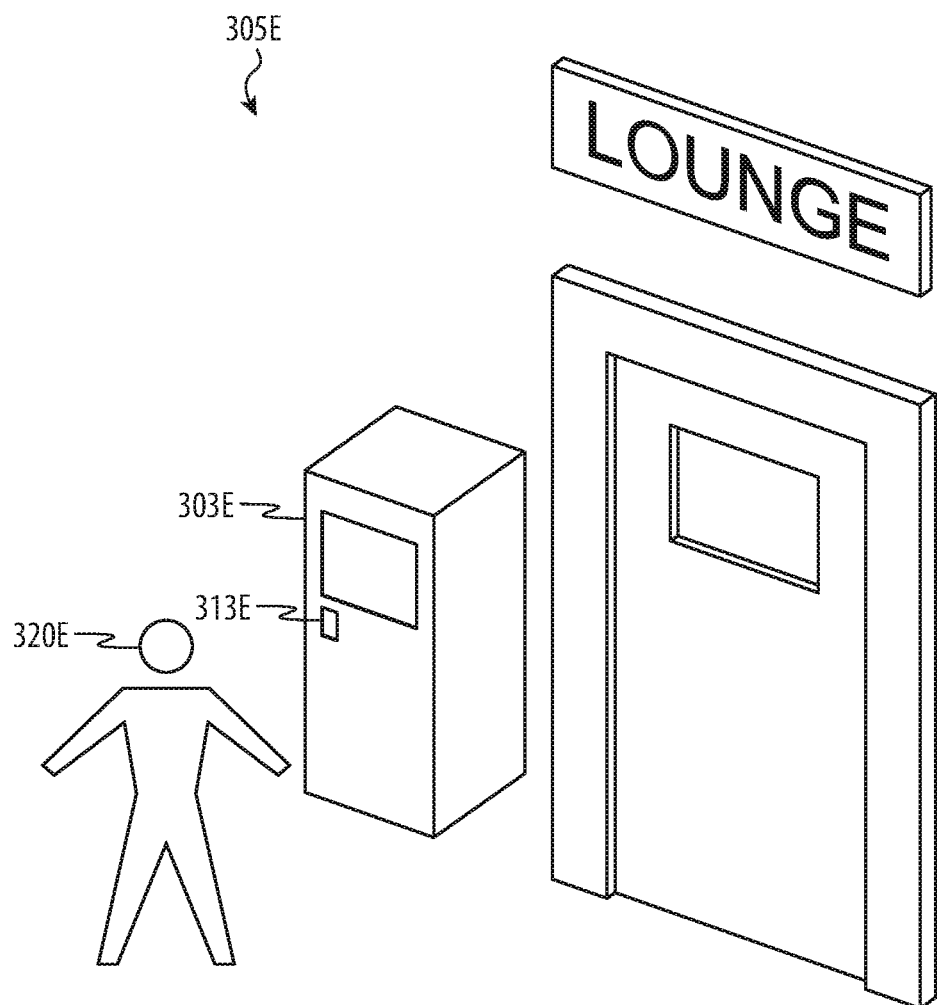
FIG. 3E illustrates a fifth example implementation of the system of FIG. 1.

FIG. 3E illustrates a fifth example implementation of the system 100 of FIG. 1. In this example, a station 303E may include an integrated biometric reader device 313E configured as a fingerprint scanner at an area 305E that controls entrance to a location, such as an airport lounge. A person 320E may provide one or more fingerprints via the fingerprint scanner to access identity information (such as a frequent flyer status) that may indicate whether or not the person is authorized to enter the airport lounge. If so, portions of the identity information that the person has authorized to be shared with the airport lounge may be provided to the airport lounge as the person enters. This may include age verification, food/drink and/or other preferences, payment information, flight data for order scheduling purposes, and so on.

Figure 3F:
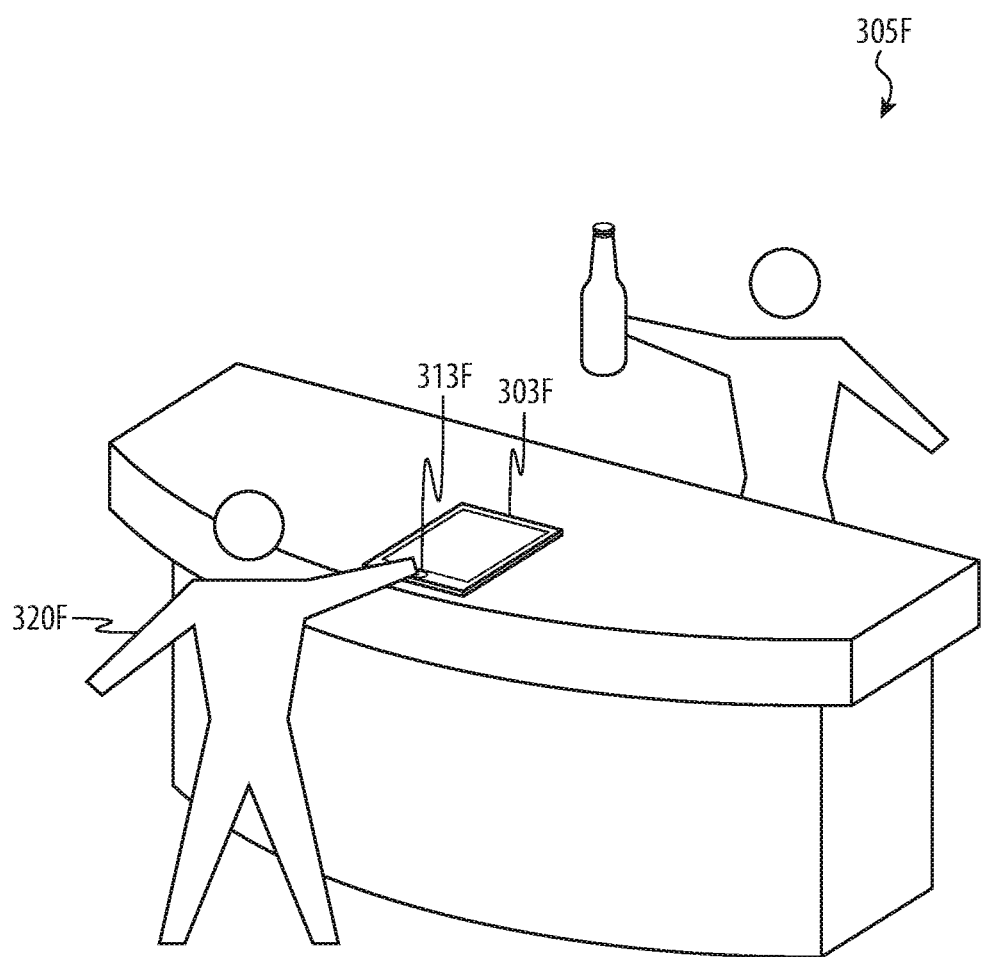
FIG. 3F illustrates a sixth example implementation of the system of FIG. 1.

FIG. 3F illustrates a sixth example implementation of the system 100 of FIG. 1. In this example, a station 303F may be configured as a point of sale terminal at an area 305F where a concession operator is located. The station 303F may be configured with an integrated biometric reader device 313F configured as a fingerprint pad that is operable to obtain one or more digital representations of fingerprints from a person 320F. This may allow the station 303F to obtain payment for provided goods and/or services, verify authorization to provide the goods and/or services to the person (such as where the goods and/or services are only legally provided to people of a certain verified age, people with a license to obtain the goods and/or services, and so on), to participate in a loyalty and/or rewards account associated with the person 320F, and so on.

Figure 3G:
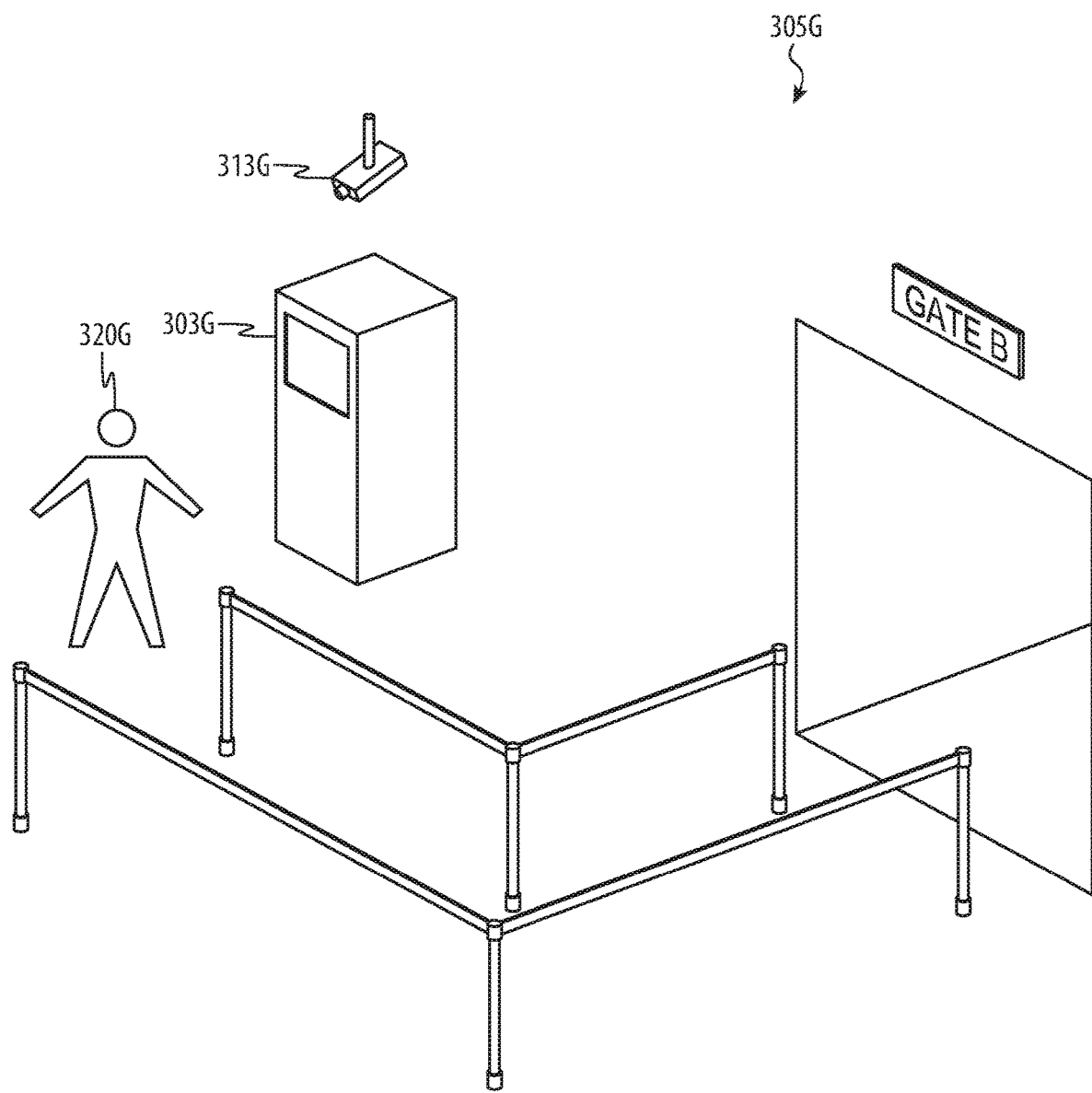
FIG. 3G illustrates a seventh example implementation of the system of FIG. 1.

FIG. 3G illustrates a seventh example implementation of the system 100 of FIG. 1. In this example, a station 303G in an area 305G may be configured to control access to an airport gate. The station 303G may include an external biometric reader device 313G configured as a camera. As people pass by the station 303G to board a plane, the biometric reader device 313G may obtain digital representations of one or more facial, iris, retina, and/or other images. Accordingly, identity information associated with the people may be determined in order to identify the people, verify the people have tickets on the associated flight, upgrade and/or sell tickets to the people, direct the people as they get on the plane, and so on.

Figure 3H:
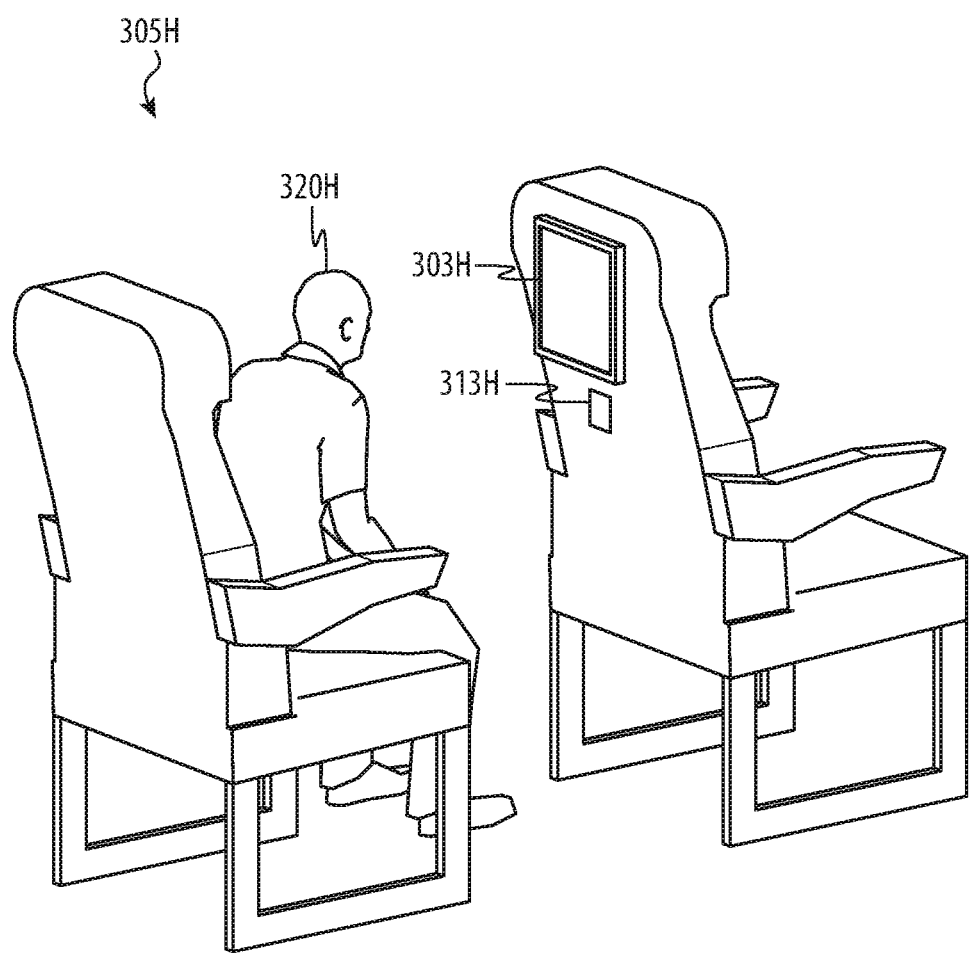
FIG. 3H illustrates an eighth example implementation of the system of FIG. 1.

FIG. 3H illustrates an eighth example implementation of the system of FIG. 1. In this example, a station 303H may be configured as a personal entertainment system at an area 305H of an aircraft or other vehicle. The personal entertainment system may be operable to control an environment around a person 320H (such as a fan, reading light, seat adjustment, and so on), control entertainment options a person can view and/or purchase and/or rent to view, control goods and/or services that the person 320H may request and/or purchase from aircraft staff, and so on. The station 303H may be configured with an integrated biometric reader device 313H configured as a fingerprint pad that is operable to obtain one or more digital representations of fingerprints from a person 320H. This may allow the station 303H to obtain payment for provided goods and/or services, verify authorization to provide the goods and/or services to the person (such as where the goods and/or services are only legally provided to people of a certain verified age, people with a license to obtain the goods and/or services, and so on), to participate in a loyalty and/or rewards account associated with the person 320H, and so on.

Figure 4:
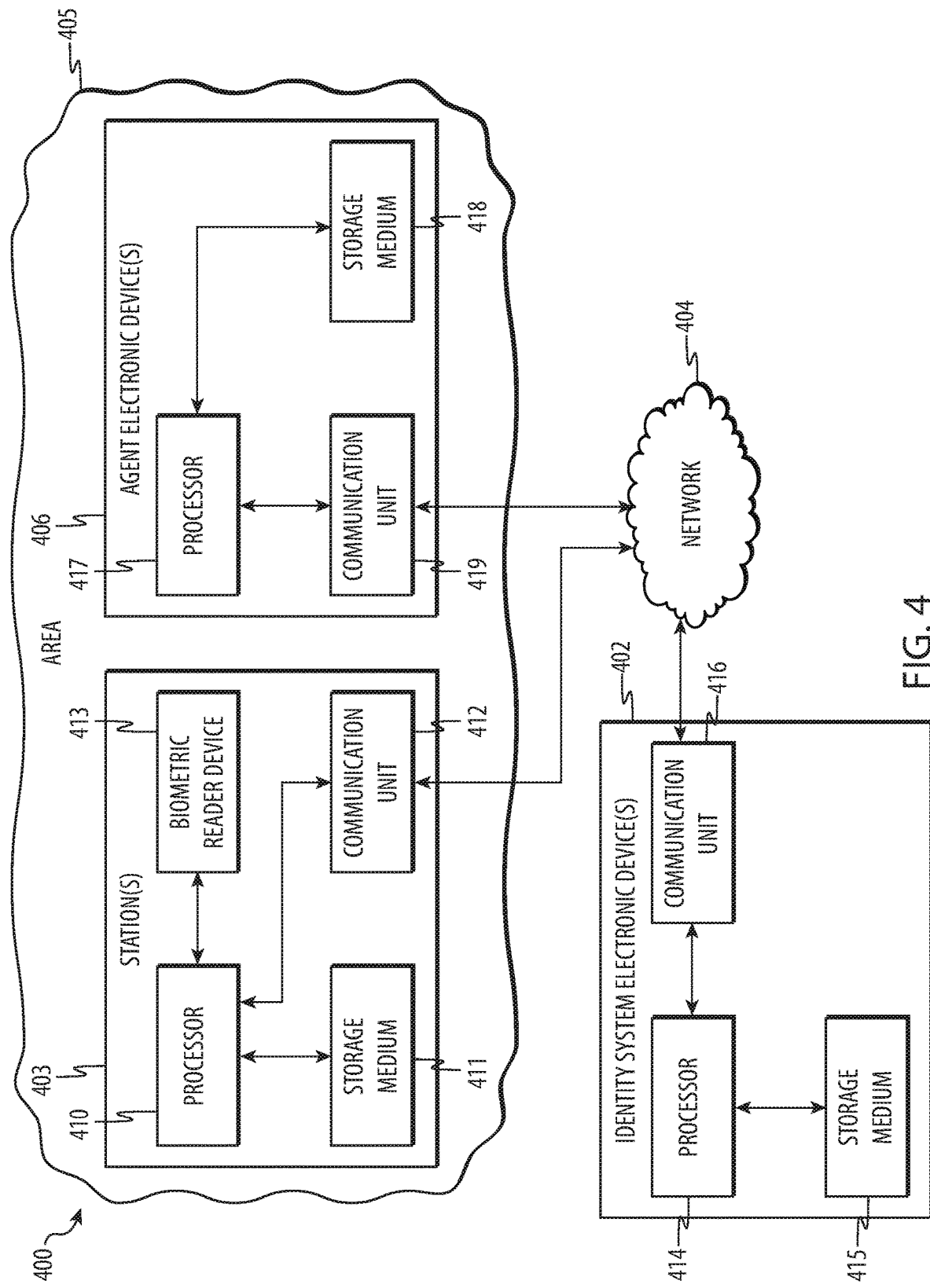
FIG. 4 depicts a second example system for using identity information to facilitate interaction with one or more people moving through one or more areas.

FIG. 4 depicts a second example system 400 for using identity information to facilitate interaction with one or more people moving through one or more areas. Similar to the system 100 of FIG. 1, the system 400 may include one or more stations 403 (which may include one or more processors 410, non-transitory storage media 411, communication units 412, biometric reader devices 413, and/or other components) located in one or more areas 405 that are operable to communicate with one or more identity system electronic devices 402 (which may include one or more processors 414, non-transitory storage media 415, communication units 416, and/or other components) via one or more networks 404. Additionally, the system 400 may include one or more agent electronic device(s) 406. The agent electronic device 406 may and/or may not also be located in the area 405.

The identity system electronic device 402 may communicate with the agent electronic device 406 to facilitate interaction of the agent electronic device 406 and/or an operator thereof with one or more people moving through the area 405. For example, the identity system electronic device 402 may estimate a path for a person and signal the agent electronic device 406 based on the path. In another example, the identity system electronic device 402 may determine a presence of a person within the area 405 and/or transmit information to the agent electronic device 406 regarding the determined presence. In still another example, the identity system electronic device 402 may receive a request from the agent electronic device 406 to communicate with the person and forward the communication to the person using the identity information. Various configurations are possible and contemplated without departing from the scope of the present disclosure.

For example, one or more agent electronic devices 406 associated with security screening and/or other security may communicate with the identity system electronic device 402 in order to identify people, determine presence of people, track and/or predict movement of people, communicate with people, and so on in order to provide security screening and/or other security. By way of illustration, a security inspection of check baggage may reveal items, such as lithium ion batteries, that may be carried on a plane but not checked. In such a situation, the agent electronic device 406 may communicate with the identity system electronic device 402 to forward a communication to a person associated with the check baggage. The person may then come to claim the items so that the check baggage may be loaded onto a plane.

In another example, one or more agent electronic devices 406 associated with an airline may communicate with the identity system electronic device 402 in order to identify people, determine presence of people, track and/or predict movement of people, communicate with people, and so on in order to check people in for flights, verify that people will be present for flights, change flight information for people, provide information to people regarding flights and/or directions for flights, and so on. By way of illustration, the agent electronic device 406 may communicate with the identity system electronic device 402 to determine people not present near a gate within a time limit (such as 20 minutes before flight, 30 minutes before a flight, and so on) and reassign seats for those people to standby passengers. The agent electronic device 406 may also communicate with the identity system electronic device 402 to determine where those people are, forward communications to those people about rescheduled flight information, and so on.

In yet another example, one or more agent electronic devices 406 associated with one or more restaurants, shops, or the like may communicate with the identity system electronic device 402 in order to identify people, determine presence of people, track and/or predict movement of people, communicate with people, and so on in order to provide goods and/or services, verify that people are authorized to obtain goods and/or services, obtain payment for goods and/or services, and so on. By way of illustration, the agent electronic device 406 may communicate with the identity system electronic device 402 to charge a person's credit card for food and drink purchased by the person.

In various implementations, the identity system electronic device 402 may be operative to respond to queries from the agent electronic device 406. The queries may involve the identity information, presence of a person in the area 405, movement of a person, and so on. In a number of implementations, a person associated with the identity information may be able to control how the identity system electronic device 402 responds to queries for that person's information and/or what identity information and/or other information the identity system electronic device 402 is authorized to provide. This may be accomplished by querying the person and receiving acknowledgements, using one or more sets of preferences stored in the identity information, and so on.

Similar to the station 403 and/or the identity system electronic device 402, the agent electronic device 406 may be any kind of electronic device and/or cloud and/or other computing arrangement. The agent electronic device 406 may include one or more processors 417, non-transitory storage media 418, communication units 419, and so on. The processor 417 may execute one or more sets of instructions stored in the non-transitory storage media 418 to perform various functions, such as communicating with the station 403 and/or the identity system electronic device 402 via the network 404 using the communication unit 419, and so on.

Although the system 100 is illustrated and described as including particular components arranged in a particular configuration that perform particular functions, it is understood that this is an example. In various implementations, various arrangements of various components that perform various functions may be implemented without departing from the scope of the present disclosure.

For example, the agent electronic device 406 is illustrated as located in the area 405. However, it is understood that this is an example. In some implementations, the agent electronic device 406 may be located outside the area 405, partially within the area 405, and so on without departing from the scope of the present disclosure.

By way of another example, the agent electronic device 406 and the station 403 are shown and described as separate devices. However, it is understood that this is an example. In various implementations, the agent electronic device 406 may include the biometric reader device 413, the agent electronic device 406 and the station 403 may be incorporated into a single device, and so on. Various configurations are possible and contemplated without departing from the scope of the present disclosure.

Figure 5:
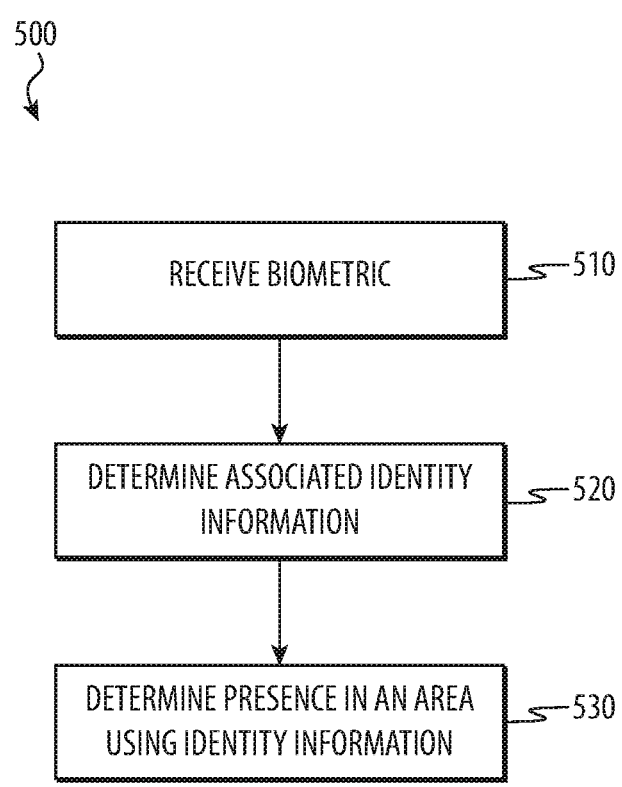
FIG. 5 depicts a flow chart illustrating a second example method for using identity information to facilitate interaction with one or more people moving through one or more areas. This method may be performed by the systems of FIGS. 1 and/or 4.

FIG. 5 depicts a flow chart illustrating a second example method 500 for using identity information to facilitate interaction with one or more people moving through one or more areas. This method 500 may be performed by the systems 100, 400 of FIGS. 1 and/or 4.

At operation 510, an electronic device, such as the identity system electronic devices 102, 402 of FIGS. 1 and/or 4, may receive one or more digital representations of one or more biometrics for a person. At operation 520, the electronic device may use the digital representation of the biometric to determine associated identity information.

At operation 530, the electronic device may determine presence of the person in an area using the identity information. For example, the electronic device may determine presence of the person in an area associated with a flight using flight information stored in the identity information (such as whether or not the person has a flight ticket, whether or not the person checked in for a flight, whether or not the person passed security screening, whether or not the person checked baggage, and so on). By way of another example, the electronic device may determine presence of the person in an area based on the location of a device from which the digital representation of the biometric was received. For example, the electronic device may assume that the person is at a security screening station based on the fact that the security screening station obtained the digital representation of the biometric from the person. In yet another example, the electronic device may determine an electronic device associated with the person in the identity information (such as a mobile telephone) and use a location component (such as a global positioning system component) of that electronic device to determine a location for the person and/or whether or not the person is present in an area based on that location. Various configurations are possible and contemplated without departing from the scope of the present disclosure.

In various examples, this example method 500 may be implemented as a group of interrelated software modules or components that perform various functions discussed herein. These software modules or components may be executed within a cloud network and/or by one or more computing devices, such as the identity system electronic device 102, 402 of FIGS. 1 and/or 4, the agent electronic device 406 of FIG. 4, and/or the stations 103, 303A-303H, 403 of FIGS. 1 and/or 3A-4.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as determining the presence of a person in an area. However, it is understood that this is an example. In some implementations, the electronic device may determine a location of the person instead of whether or not the person is present in a particular area. Various configurations are possible and contemplated without departing from the scope of the present disclosure.

In some embodiments, a system for facilitating interaction with one or more people moving through one or more areas may include at least one non-transitory storage medium that stores instructions and at least one processor. The at least one processor may execute the instructions to receive a digital representation of a biometric for a person, use the digital representation of the biometric to determine identity information associated with the person, and determine a presence of the person within at least one area using the identity information.

In various examples, the at least one processor may receive an inquiry regarding the presence of the person within the at least one area from an agent electronic device and provide information regarding the presence of the person within the at least one area to the agent electronic device. In some examples, the at least one processor may use the presence of the person within the at least one area and the identity information to estimate a path for the person. In various examples, the at least one processor may determine the presence of the person within the at least one area using a location of an electronic device from which the at least one processor receives the digital representation of the biometric. In a number of examples, the at least one processor may track movement of the person within the at least one area in the identity information.

In some examples, the at least one processor may determine the presence of the person within the at least one area by estimating a location of an electronic device indicated as associated with the person in the identity information. In a number of such examples, the at least one processor may estimate the location of the electronic device using global positioning system data.

Figure 6:
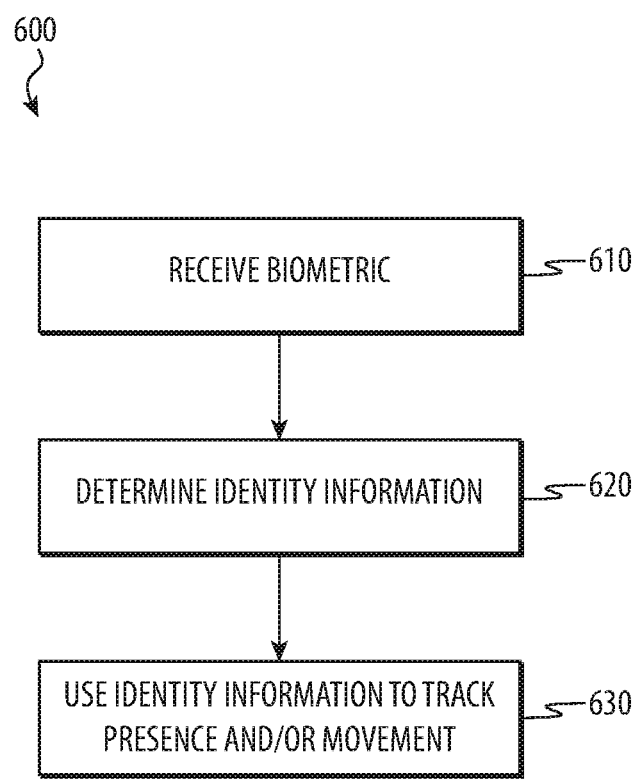
FIG. 6 depicts a flow chart illustrating a third example method for using identity information to facilitate interaction with one or more people moving through one or more areas. This method may be performed by the systems of FIGS. 1 and/or 4.

FIG. 6 depicts a flow chart illustrating a third example method 600 for using identity information to facilitate interaction with one or more people moving through one or more areas. This method 600 may be performed by the systems 100, 400 of FIGS. 1 and/or 4.

At operation 610, an electronic device, such as the identity system electronic devices 102, 402 of FIGS. 1 and/or 4, may receive one or more digital representations of one or more biometrics for a person. At operation 620, the electronic device may use the digital representation of the biometric to determine associated identity information.

At operation 630, the electronic device may use the identity information to track presence and/or movement of the person within an area. For example, the electronic device may track the stations from which digital representations of the biometrics are received, the path between such stations, correspondences between those such stations and data included in the identity information (such as flight data for the person, frequented stores, and so on), movement of an electronic device associated with the person, or the like.

In various examples, this example method 600 may be implemented as a group of interrelated software modules or components that perform various functions discussed herein. These software modules or components may be executed within a cloud network and/or by one or more computing devices, such as the identity system electronic device 102, 402 of FIGS. 1 and/or 4, the agent electronic device 406 of FIG. 4, and/or the stations 103, 303A-303H, 403 of FIGS. 1 and/or 3A-4.

Although the example method 600 is illustrated and described as including particular operations performed in a particular order, it is understood that this is an example. In various implementations, various orders of the same, similar, and/or different operations may be performed without departing from the scope of the present disclosure.

For example, in some implementations, the electronic device may be operable to perform the additional task of responding to requests querying the tracked presence and/or movement of the person. Various configurations are possible and contemplated without departing from the scope of the present disclosure.

Figure 7:
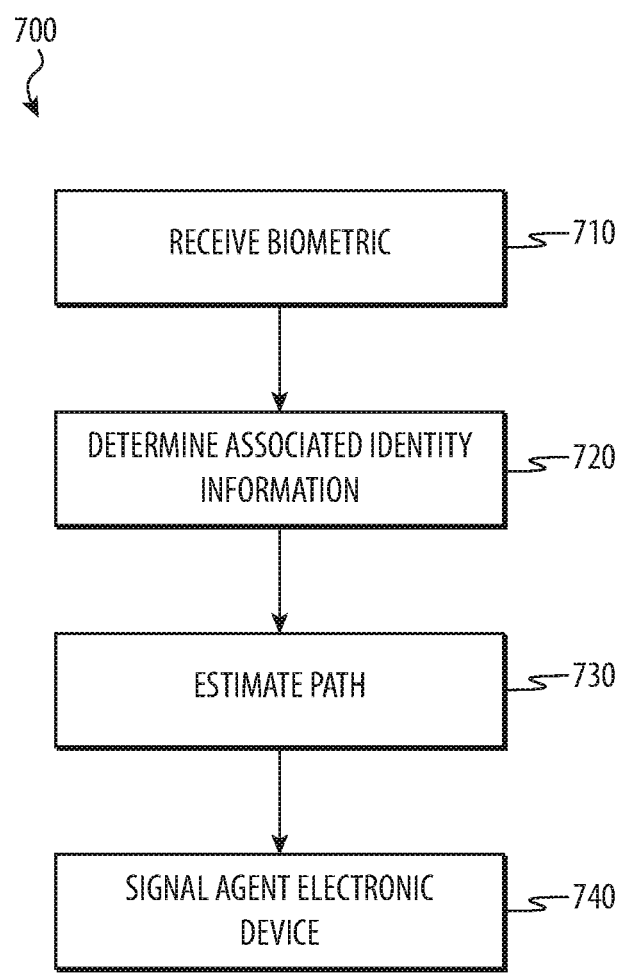
FIG. 7 depicts a flow chart illustrating a fourth example method for using identity information to facilitate interaction with one or more people moving through one or more areas. This method may be performed by the systems of FIGS. 1 and/or 4.

FIG. 7 depicts a flow chart illustrating a fourth example method 700 for using identity information to facilitate interaction with one or more people moving through one or more areas. This method 700 may be performed by the systems 100, 400 of FIGS. 1 and/or 4.

At operation 710, an electronic device, such as the identity system electronic devices 102, 402 of FIGS. 1 and/or 4, may receive one or more digital representations of one or more biometrics for a person. At operation 720, the electronic device may use the digital representation of the biometric to determine identity information associated with the digital representation of the biometric.

At operation 730, the electronic device may use the identity information to estimate a path for the person through one or more areas. For example, the electronic device may track the stations from which digital representations of the biometrics are received, the path between such stations, correspondences between those such stations and data included in the identity information (such as flight data for the person, frequented stores, and so on), movement of an electronic device associated with the person, and/or other data. The electronic device may evaluate this various data, compare the various data to each other, and so on. Using these evaluations and comparisons, the electronic device may estimate a path for the person.

At operation 740, the electronic device may signal one or more agent electronic devices. The electronic device may signal the agent electronic device in response to a request, based on evaluating the estimated path, and so on. For example, an airline agent electronic device may query to see when the person will arrive at an airport gate. By way of another example, the electronic device may signal a security screening agent device to indicate that the person will reach security screening at a particular time. Various configurations are possible and contemplated without departing from the scope of the present disclosure.

In various examples, this example method 700 may be implemented as a group of interrelated software modules or components that perform various functions discussed herein. These software modules or components may be executed within a cloud network and/or by one or more computing devices, such as the identity system electronic device 102, 402 of FIGS. 1 and/or 4, the agent electronic device 406 of FIG. 4, and/or the stations 103, 303A-303H, 403 of FIGS. 1 and/or 3A-4.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as estimating a path for the person. However, in some implementations, the electronic device may estimate where the person will go and when the person will arrive without estimating a full path that the person will travel. Various configurations are possible and contemplated without departing from the scope of the present disclosure.

In various implementations, a system for facilitating interaction with one or more people moving through one or more areas may include at least one non-transitory storage medium that stores instructions, at least one communication unit, and at least one processor communicably coupled to the at least one communication unit. The at least one processor may execute the instructions to receive a digital representation of a biometric for a person, use the digital representation of the biometric to determine identity information associated with the person, estimate a path for the person within at least one area, and signal an agent electronic device based on the path using the at least one communication unit.

In some examples, the at least one processor may analyze traffic for the at least one area using at least the identity information. In various such examples, the at least one processor may signal the agent electronic device, using the at least one communication unit, to shift a resource based on the traffic. In a number of examples, the at least one processor may use the at least one communication unit to transmit a redirection message based on the traffic to an electronic device indicated as associated with the person in the identity information. By way of illustration, the at least one processor may transmit the redirection message to prioritize a first portion of the traffic over a second portion of the traffic. In various such examples, the traffic may include data from biometric identifications of other people.

In some such examples, the traffic may include data regarding people within the at least one area received from the agent electronic device.

Figure 8:
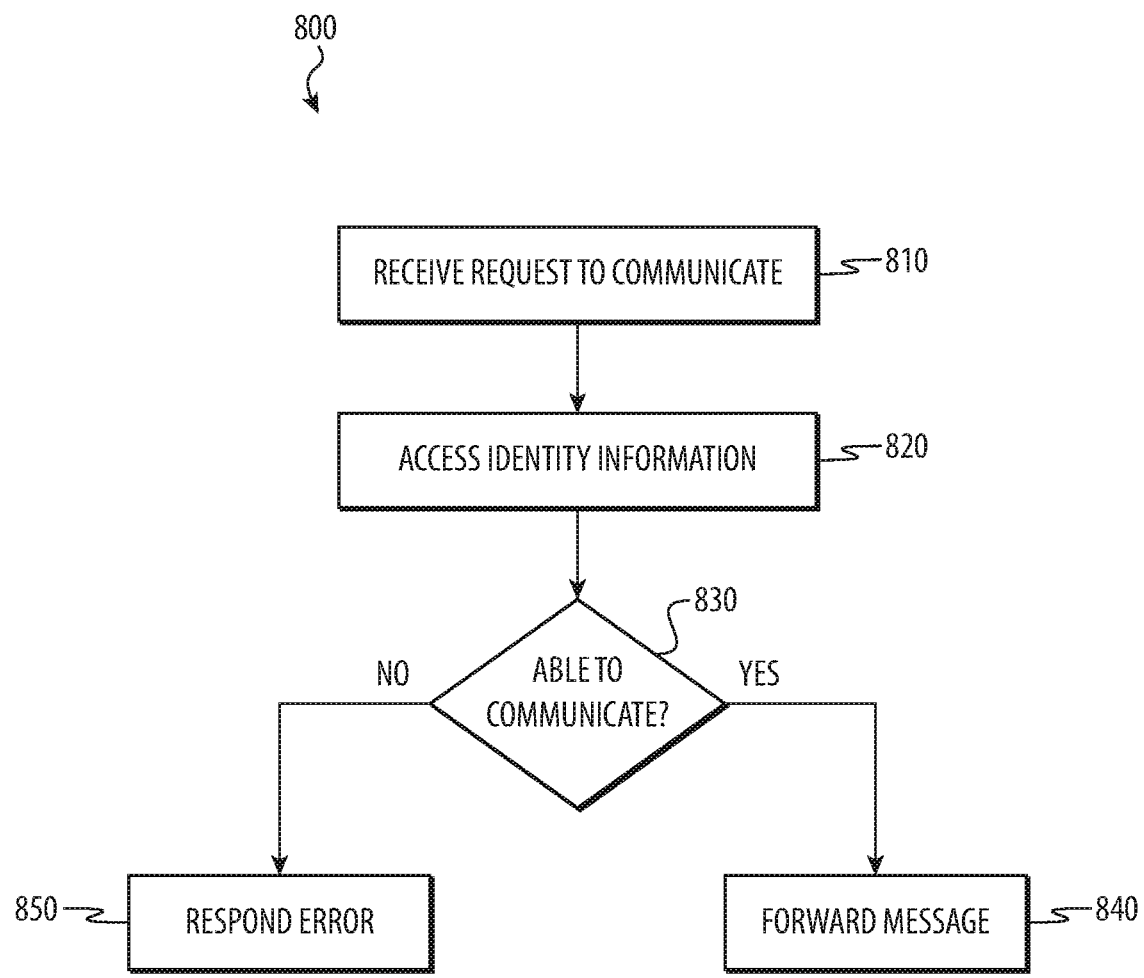
FIG. 8 depicts a flow chart illustrating a fifth example method for using identity information to facilitate interaction with one or more people moving through one or more areas. This method may be performed by the systems of FIGS. 1 and/or 4.

FIG. 8 depicts a flow chart illustrating a fifth example method 800 for using identity information to facilitate interaction with one or more people moving through one or more areas. This method 800 may be performed by the systems 100, 400 of FIGS. 1 and/or 4.

At operation 810, an electronic device, such as the identity system electronic devices 102, 402 of FIGS. 1 and/or 4, may receive a request to communicate with a person. In some implementations, the request may be to communicate with a person in an area.

At operation 820, the electronic device accesses identity information stored for the person. For example, the electronic device may use the identity information to determine if the requestor is authorized to communicate with the person, whether or not contact information (such as a mobile telephone number, an email address and/or other messaging identifier, and so on) is stored for the person, whether or not the person is within an area, and so on.

At operation 830, the electronic device determines whether or not the electronic device is able to communicate with the person. For example, the electronic device may determine that the electronic device is able to communicate with the person if the requestor is authorized to communicate with the person, if contact information is available, the person is located within an area, and so on. Conversely, the electronic device may determine that the electronic device is unable to communicate with the person if the requestor is not authorized to communicate with the person, if contact information is not available, the person is not located within an area, and so on. However, it is understood that these are examples and that various configurations are possible and contemplated without departing from the scope of the present disclosure.

If the electronic device is able to communicate with the person, the flow may proceed to operation 840 where the electronic device forwards the requested communication to the person. If not, the flow may proceed to operation 850 where the electronic device may respond to the requestor with an error.

For example, an airline agent electronic device may update ticket information for a person and request the electronic device communicate the updated ticket information to the person. As such, the electronic device may receive the request to communicate with the person, access identity information for the person, determine that the electronic device can communicate with the person, and forward the updated ticket information to the person. Various configurations are possible and contemplated without departing from the scope of the present disclosure.

In various examples, this example method 800 may be implemented as a group of interrelated software modules or components that perform various functions discussed herein. These software modules or components may be executed within a cloud network and/or by one or more computing devices, such as the identity system electronic device 102, 402 of FIGS. 1 and/or 4, the agent electronic device 406 of FIG. 4, and/or the stations 103, 303A-303H, 403 of FIGS. 1 and/or 3A-4.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as forwarding the requested communication to the person. However, it is understood that this is an example. In various implementations, the electronic device may instead respond to the requestor with contact information for the person and allow the requestor to communicate with the person directly. Various configurations are possible and contemplated without departing from the scope of the present disclosure.

In various embodiments, a system for facilitating interaction with one or more people moving through one or more areas may include at least one non-transitory storage medium that stores instructions, at least one communication unit, and at least one processor communicably coupled to the at least one communication unit. The at least one processor may execute the instructions to receive a digital representation of a biometric for a person, use the digital representation of the biometric to determine identity information associated with the person, receive a request to communicate with the person from an agent electronic device using the at least one communication unit, and forward a communication to the person according to the request using the identity information and the at least one communication unit.

In some examples, the communication may provide directions to the person. In various examples, the communication may include updated ticket information for the person. In a number of examples, the at least one processor may forward the communication using at least one of a phone number or an email address included in the identity information.

In various examples, the communication may include an offer for the person. In some such examples, the at least one processor may be operable to receive a response from the person accepting the offer.

Figure 9:
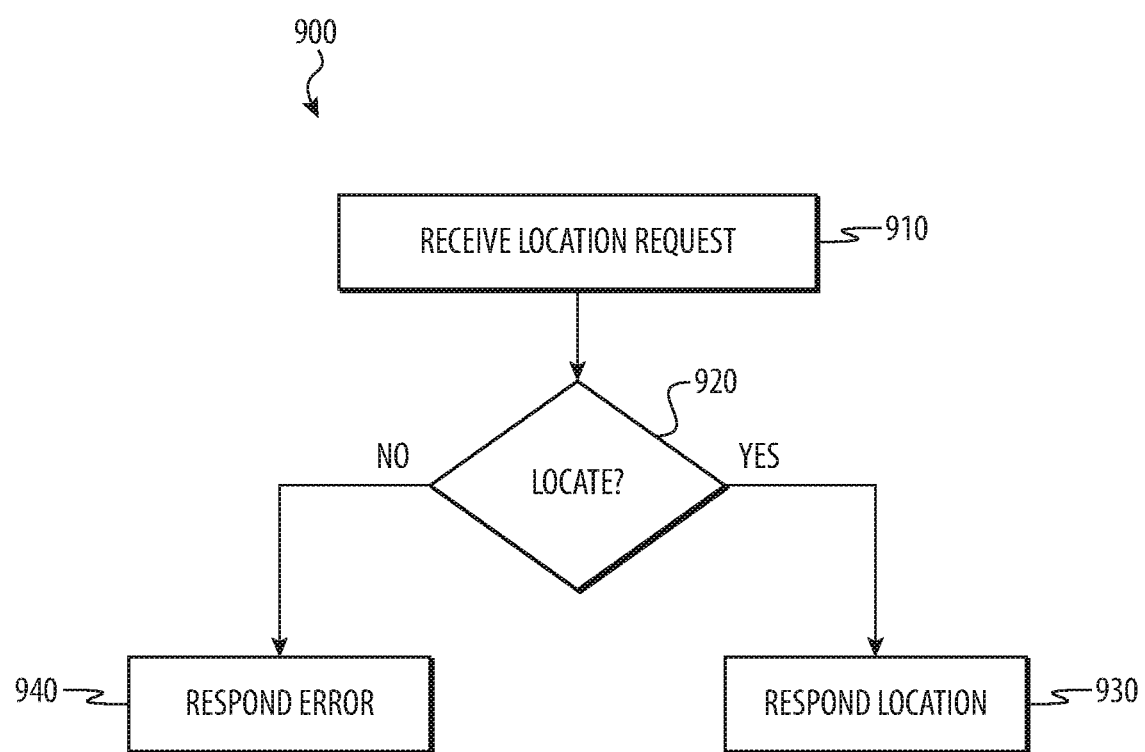
FIG. 9 depicts a flow chart illustrating a sixth example method for using identity information to facilitate interaction with one or more people moving through one or more areas. This method may be performed by the systems of FIGS. 1 and/or 4.

FIG. 9 depicts a flow chart illustrating a sixth example method 900 for using identity information to facilitate interaction with one or more people moving through one or more areas. This method 900 may be performed by the systems 100, 400 of FIGS. 1 and/or 4.

At operation 910, an electronic device, such as the identity system electronic devices 102, 402 of FIGS. 1 and/or 4, may receive a location request for a person. The location request may request information regarding the presence of a person within an area, within a particular portion of an area, and so on At operation 920, the electronic device may determine whether or not the electronic device can locate the person. For example, the electronic device may be operative to retrieve identity information for a person (such as identity information that may be used in an identification system, age verification system, and so on) and use that identity information to determine the person's location. As such, the electronic device may determine the person cannot be located if the electronic device does not have sufficient information, if the electronic device is not authorized to respond, and so on. Conversely, the electronic device may determine the person can be located if the electronic device does have sufficient information, if the electronic device is authorized to respond, and so on.

In some implementations, the electronic device may determine the location of the person using flight information stored in the identity information (such as whether or not the person has a flight ticket, whether or not the person checked in for a flight, whether or not the person passed security screening, whether or not the person checked baggage, and so on). In various implementations, the electronic device may determine the location of the person based on the location of a device from which a digital representation of a biometric associated with the person was received. For example, the electronic device may assume that the person is at a security screening station based on the fact that the security screening station obtained the digital representation of the biometric from the person. In a number of implementations, the electronic device may determine an electronic device associated with the person in the identity information (such as a mobile telephone) and use a location component (such as a global positioning system component) of that electronic device to determine a location for the person. Various configurations are possible and contemplated without departing from the scope of the present disclosure.

If the electronic device is able to locate the person, the flow may proceed to operation 930 where the electronic device responds with the person's location. If not, the flow may proceed to operation 940 where the electronic device may respond to the requestor with an error.

For example, a security screening agent electronic device may use a governmental flight status database to retrieve information indicating that a person has a flight within the next few hours. The security screening agent electronic device may then request information regarding whether or not the person is located in the airport on the way to security screening in order to estimate security screening traffic flow. In such an example, the electronic device may determine that the person has checked in for the flight and dropped off check baggage recently and is thus likely on the way to security screening. As such, the electronic device may respond affirmatively.

By way of another example, a merchant may request to know whether or not the person is proximate to the merchant's store. If the electronic device is able to confirm this for the merchant, the merchant may request that the electronic device provide the person an offer (such as an offer for free and/or discounted goods or services if the person comes into the merchant's store and so on). As such, the electronic device may forward the offer to the person. In some implementations, the person may be able to accept the offer, such as where the offer is in a communication provided to a mobile electronic device of the person (such as an offer for discounted goods and/or services if the person agrees to membership in a loyalty or rewards account involving the merchant) and the person can use the electronic device to accept the offer. Various configurations are possible and contemplated without departing from the scope of the present disclosure.

In various examples, this example method 900 may be implemented as a group of interrelated software modules or components that perform various functions discussed herein. These software modules or components may be executed within a cloud network and/or by one or more computing devices, such as the identity system electronic device 102, 402 of FIGS. 1 and/or 4, the agent electronic device of FIG. 4, and/or the stations 103, 303A-303H, 403 of FIGS. 1 and/or 3A-4.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 is illustrated and described as responding to a location request with the person's location. However, it is understood that this is an example. In various implementations, the electronic device may contact an electronic device associated with the person and request authorization to provide the person's location to the requestor. In such an implementation, the electronic device may refrain from providing the person's location to the requestor unless authorization from the person is received. Various configurations are possible and contemplated without departing from the scope of the present disclosure.

Figure 10:
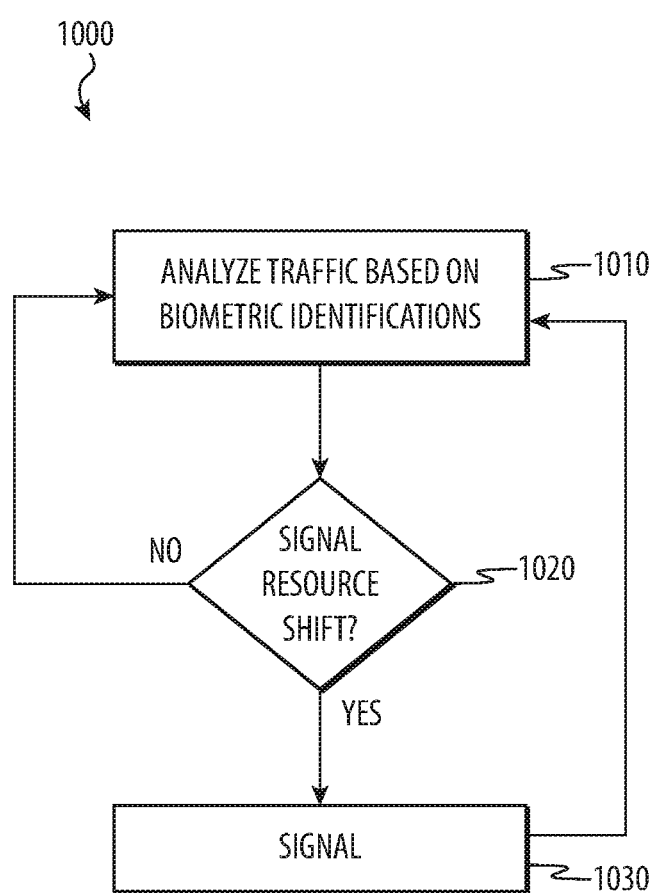
FIG. 10 depicts a flow chart illustrating a seventh example method for using identity information to facilitate interaction with one or more people moving through one or more areas. This method may be performed by the systems of FIGS. 1 and/or 4.

FIG. 10 depicts a flow chart illustrating a seventh example method 1000 for using identity information to facilitate interaction with one or more people moving through one or more areas. This method 1000 may be performed by the systems 100, 400 of FIGS. 1 and/or 4.

At operation 1010, an electronic device, such as the identity system electronic devices 102, 402 of FIGS. 1 and/or 4, may analyze traffic of people in an area. In some implementations, the traffic may be analyzed based on data from biometric identifications performed using a biometric identification system. In various implementations, this data may be supplemented and/or substituted with data from one or more other systems (such as security screening traffic data provided by a security screening system, airline check-in traffic data provided by an airline system, and so on). In a number of implementations, other identity information may be evaluated as part of analyzing traffic, which may or may not be related to such biometric identifications, data received from the one or more other systems, and so on. For example, the electronic device may be operative to analyze flight data (such as whether or not people have a flight ticket, whether or not people have checked in for a flight, whether or not people have passed security screening, whether or not people checked baggage, and so on), historic and/or current movement patterns (such as based on locations of devices that obtain digital representation of biometrics associated with people, tracking location components of electronic devices associated with people, and so on), purchasing patterns, and so on.

At operation 1020, the electronic device determines whether or not to signal a resource shift. If not, the flow may return to operation 1010 where the electronic device may continue to analyze traffic. Otherwise, if the electronic device determines to signal the resource shift, the electronic device signals accordingly at operation 1030. In some implementations, the electronic device may signal the resource shift by transmitting one or more notifications to one or more agent electronic devices.

For example, the electronic device may determine to shift resources of a security screening system. This may involve moving personnel, opening and/or closing one or more security screening lanes and/or security screening locations, redirecting people for security screening, activating and/or disabling security screening components, and so on. By way of illustration, the electronic device may determine that one security screening location at an airport will experience significantly higher traffic than a second security screening location at the airport. In response, the electronic device may redirect personnel from the second security screening location to the first security screening location. Alternatively and/or additionally, the electronic device may transmit one or more redirection messages to redirect people to the second security screening location instead of the first security screening location. Various configurations are possible and contemplated without departing from the scope of the present disclosure.

In various examples, this example method 1000 may be implemented as a group of interrelated software modules or components that perform various functions discussed herein. These software modules or components may be executed within a cloud network and/or by one or more computing devices, such as the identity system electronic device 102, 402 of FIGS. 1 and/or 4, the agent electronic device 406 of FIG. 4, and/or the stations 103, 303A-303H, 403 of FIGS. 1 and/or 3A-4.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 is illustrated and described as determining whether or not to shift resources based on the analyzed traffic. However, it is understood that this is an example. In some implementations, the electronic device may analyze the traffic and notify one or more agent electronic devices regarding the analysis. In such an implementation, the agent electronic device may determine whether or not to shift resources instead of the electronic device determining such. Various configurations are possible and contemplated without departing from the scope of the present disclosure.

Although the above illustrates and describes a number of embodiments, it is understood that these are examples. In various implementations, various techniques of individual embodiments may be combined without departing from the scope of the present disclosure.

In various implementations, the techniques disclosed herein may be used in the context of facilitating interacting with one or more people moving through one or more airports. This may allow use of biometrics, credentialed authentication (such as real time driver's license, passport, and/or other identification card verification), and/or known identity as part of security screening. Determined identity may be used to communicate with travelers through airports. Identity and data such as that from governmental secure flight databases may be used to direct staffing and/or travelers real time to maximize efficiency. Verifications may be active and/or passive to allow for queue entry, differentiated queueing for load balancing, electronic gating and/or screening, and so on. Queues may be managed based on flight times, delayed flights, and so on. Terminal maps and/or various directions may be provided for wayfinding, construction rerouting, and soon. Issues may be detected by determining that people are not where they are predicted to be. Missed flights may be detected and/or estimated and automatically handled. Airline, security screening, baggage handling, and/or other employees may be monitored. Various configurations are possible and contemplated without departing from the scope of the present disclosure.

As described above and illustrated in the accompanying figures, the present disclosure relates to facilitating interaction with people moving through areas. A system may receive a digital representation of a biometric for a person, use the digital representation of the biometric to determine and/or otherwise retrieve identity information associated with the person, and use the identity information to perform one or more actions related to the person's presence in one or more areas. For example, the system may estimate a path for the person and signal an agent electronic device based on the path. In another example, the system may determine a presence of a person within the area and/or transmit information to an agent electronic device regarding the determined presence. In still another example, the system may receive a request to communicate with the person and forward the communication to the person using the identity information. Various configurations are possible and contemplated without departing from the scope of the present disclosure.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM);

erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for facilitating interaction with one or more people moving through at least one airport, comprising:
   at least one non-transitory storage medium that stores instructions;
   at least one communication unit; and
   at least one processor, communicably coupled to the at least one communication unit, that executes the instructions to:
   receive a digital representation of a biometric for a person in the at least one airport;
   use the digital representation of the biometric to determine identity information associated with the person;
   generate an analysis of airport traffic for the at least one airport using at least the identity information; and
   signal an agent electronic device using the at least one communication unit to shift airport personnel based on the analysis.

2. The system of claim 1, wherein the at least one processor signals the agent electronic device to shift the airport personnel based on the analysis and an estimated current destination for the person.

3. The system of claim 2, wherein the estimated current destination for the person is estimated using an estimated current location of the person.

4. The system of claim 2, wherein the estimated current destination for the person is estimated using the identity information.

5. The system of claim 1, wherein the airport personnel comprises security personnel.

6. The system of claim 1, wherein the airport personnel comprises baggage handlers.

7. The system of claim 1, wherein the airport personnel comprises gate agents.

8. A system for facilitating interaction with one or more people moving through at least one airport, comprising:
   at least one non-transitory storage medium that stores instructions;
   at least one communication unit; and
   at least one processor, communicably coupled to the at least one communication unit, that executes the instructions to:
   receive a digital representation of a biometric for a person in the at least one airport;
   use the digital representation of the biometric to determine identity information associated with the person; and
   transmit a message to an electronic device associated with the person using the at least one communication unit to prioritize a first portion of airport traffic over a second portion of the airport traffic wherein the person is part of the first portion of the airport traffic or the second portion of the airport traffic.

9. The system of claim 8, wherein the message prioritizes the first portion of the airport traffic over the second portion of the airport traffic at a check-in area.

10. The system of claim 8, wherein the message prioritizes the first portion of the airport traffic over the second portion of the airport traffic at a security area.

11. The system of claim 8, wherein the message prioritizes the first portion of the airport traffic over the second portion of the airport traffic at a boarding area.

12. The system of claim 8, wherein the message prioritizes the first portion of the airport traffic over the second portion of the airport traffic at a lounge.

13. The system of claim 8, wherein the message prioritizes the first portion of the airport traffic over the second portion of the airport traffic at a restaurant.

14. The system of claim 8, wherein the message prioritizes the first portion of the airport traffic over the second portion of the airport traffic at a customs area.

15. A system for facilitating interaction with one or more people moving through at least one airport, comprising:
    at least one non-transitory storage medium that stores instructions;
    at least one communication unit; and
    at least one processor, communicably coupled to the at least one communication unit, that executes the instructions to:
    receive a digital representation of a biometric for a person in the at least one airport;
    use the digital representation of the biometric to determine identity information associated with the person;
    based upon an estimated location for the person in the at least one airport, receive a request from an agent electronic device using the at least one communication unit, the request comprising a commercial offer to the person that the person can accept to engage in a commercial transaction;
    forward a communication to the person according to the request using the identity information and the at least one communication unit; and
    receive a response to the commercial offer from the person using the at least one communication unit.

16. The system of claim 15, wherein the response is an acceptance.

17. The system of claim 15, wherein the commercial transaction is associated with the estimated location.

18. The system of claim 15, wherein the at least one processor processes a payment for the commercial offer for the person.

19. The system of claim 18, wherein the at least one processor processes the payment using financial data stored in the identity information.

20. The system of claim 18, wherein the at least one processor verifies flight information for the person using the identity information as part of processing the payment.

* * * * *